(12) United States Patent
Lin et al.

(10) Patent No.: US 11,155,477 B2
(45) Date of Patent: Oct. 26, 2021

(54) PORTABLE DEVICE AND SYSTEM FOR GENERATING STERILE WATER AND METHOD FOR THE SAME

(71) Applicant: Ezek Technology, Inc., Taipei (TW)

(72) Inventors: Victor J. Lin, Washington, NJ (US); Shih-Hsu Lin, Taipei (TW); Wen-Yo Lin, Taipei (TW); Foung-Inn Lin, Taipei (TW)

(73) Assignee: Ezek Technology, Inc., Taipei (TW)

( * ) Notice: Subject to any disclaimer, the term of this patent is extended or adjusted under 35 U.S.C. 154(b) by 0 days.

(21) Appl. No.: 16/575,586

(22) Filed: Sep. 19, 2019

(65) Prior Publication Data

US 2020/0095137 A1 Mar. 26, 2020

Related U.S. Application Data

(60) Provisional application No. 62/734,158, filed on Sep. 20, 2018.

(51) Int. Cl.
*C02F 1/44* (2006.01)
*C02F 1/28* (2006.01)
*B01D 61/00* (2006.01)
*C02F 101/32* (2006.01)

(52) U.S. Cl.
CPC ............... *C02F 1/44* (2013.01); *B01D 61/00* (2013.01); *C02F 1/281* (2013.01); *B01D 2311/2626* (2013.01); *B01D 2311/2692* (2013.01); *B01D 2313/18* (2013.01); *B01D 2313/26* (2013.01); *B01D 2313/40* (2013.01); *B01D 2313/50* (2013.01); *C02F 2101/322* (2013.01); *C02F 2201/005* (2013.01); *C02F 2209/00* (2013.01); *C02F 2303/04* (2013.01)

(58) Field of Classification Search
CPC .... C02F 1/44; C02F 1/281; C02F 1/28; C02F 2101/322; C02F 2201/005; C02F 2209/00; C02F 2303/04; B01D 61/00; B01D 2311/2626; B01D 2311/2692; B01D 2313/18; B01D 2313/26; B01D 2313/40; B01D 2313/50
USPC ............................................. 210/94
See application file for complete search history.

(56) References Cited

U.S. PATENT DOCUMENTS

| | | | | |
|---|---|---|---|---|
| 4,522,713 A | * | 6/1985 | Nussbaumer | B01D 33/01 210/136 |
| 4,966,692 A | * | 10/1990 | Overy | B01D 24/40 210/123 |
| 2003/0094422 A1 | * | 5/2003 | Perkins | B01D 21/0012 210/764 |
| 2005/0211643 A1 | * | 9/2005 | Phillips | A22C 21/0061 210/753 |

* cited by examiner

*Primary Examiner* — Robert Clemente
*Assistant Examiner* — Akash K Varma
(74) *Attorney, Agent, or Firm* — Haverstock & Owens LLP (57) ABSTRACT

A system for generating sterile water is provided, including: a liquid holding container having thereon a container outlet; a filtration device including therein a low-pressure-differential pathogen filtration portion, wherein the filtration device has a filtration inlet and a filtration outlet; and a gas tube; wherein the container outlet is connected to the filtration inlet; wherein the filtration inlet has a gas hole with one end connected to the gas hole and the other end having a buoy; wherein the sterile water is substantially pathogen-free.

18 Claims, 11 Drawing Sheets

PORTABLE DEVICE AND SYSTEM FOR GENERATING STERILE WATER AND METHOD FOR THE SAME

BACKGROUND OF THE INVENTION

Field of the Invention

The present disclosure relates to portable systems for generating sterile water and the method thereof. More particularly, the present disclosure relates to a portable system for generating healthful, safe sterile drinking water by filtration and the method thereof.

Description of the Prior Art

Safe sterile drinking water is of vital importance to survival of human beings. In 2015, the World Health Organization's statistical reports estimate people with no quick access to safe drinking water facilities at 2.1 billion and estimate people living in regions facing severe water shortage at 1.9 billion. Owing to global warming and population growth, the people living in regions facing severe water shortage will increase to 3 billion by 2025. A study conducted by the World Health Organization in 2015 shows that, out of the 2.1 billion people with no quick access to safe drinking water facilities, 1.3 billion take 30 minutes traveling to safe drinking water facilities in order to fetch drinking water, 263 million take more than 30 minutes traveling to fetch safe drinking water, 423 million fetch drinking water from unprotected wells/springs, 159 million drink unprocessed water from groundwater sources, such as rivers, streams, lakes and ponds. The aforesaid water is unsafe to drink, because its sources are contaminated with animal feces, and thereby can spread waterborne diseases, such as diarrhea, cholera, dysentery, typhoid fever, and poliomyelitis. The number of people who die from diarrhea yearly is estimated at 842000; out of these victims, 361000 are children under 5 years of age, for drinking dirty water and living in unsanitary conditions.

The aforesaid diseases are caused by waterborne pathogens. Common waterborne bacteria include *Salmonella, Shigella, Yersinia, Mycobacterium, Escherichia coli, Campylobacter jejuni*, and *Vibrio cholerae*. Common waterborne viruses include Enterovirus, Poliovirus, Coxsackie virus, Echovirus, Hepatitis virus, and Rotavirus. Furthermore, cryptosporidium, a waterborne parasite, contaminates water and claims lives. Both the World Health Organization and the Environmental Protection Agency of the United States enacted laws on bacteria in drinking water, but not on viruses and cryptosporidium in drinking water. The United States Department of Defense enacted a law on pathogens in drinking water, stipulating elimination of viruses (for example, Hepatitis virus) greater than 4 logs (>99.99%), bacteria (for example, *Escherichia coli*) greater than 5 logs (>99.999%), and cryptosporidium greater than 3 logs (>99.9%). Removal of the pathogens from water is achieved by sterilization methods as follows:

1. high-temperature sterilization, for example, boiling: high-temperature boiling is an effective sterilization method in four situations: performed in small scale; high temperature cannot destroy effective constituents; cooling time is not an important factor; at low temperature. However, high-temperature boiling is not the best sterilization method in three situations: at high temperature; tropical regions; in the absence of ignition sources and related tools.

2. chemical oxidation: mainly performed with chlorine, chlorine derivatives, or ozone to destroy bacteria. Chemical oxidation is widely used in sterilization of tap water. However, if bacteria abound in tap water, vigorous oxidation of chlorine will cause rupture of bacterial cellular membrane, leading to release of endotoxins, i.e., shattered dead bodies of bacteria. Intake of water which contains the endotoxins can cause fevers. Furthermore, chlorine and derivatives often cause other diseases and cancers.

3. ultraviolet (UV): UV lamps are effective bactericides. However, owing to the aging of the UV lamps and the abundance of bacteria in water, some of the bacteria are hidden, and therefore the performance of the UV lamps decreases markedly. In case of high flow rate of water or overly short duration of irradiation, the performance of the UV lamps will deteriorate. Furthermore, the UV lamps are not only more expensive than the other sterilization methods but also require power supply. Last but not least, when UV destroys pathogens, a large amount of endotoxins is released, that is the cause of fever 4. filtration membrane: micro filtration membrane, ultra filtration membrane and RO (reverse osmosis) membrane can filter out bacteria and cryptosporidium, but viruses can be filtered out with RO membrane only. However, micro filtration membrane, ultra filtration membrane and RO membrane require pressure (from an electrically-driven pump). RO membrane needs the greatest amount of electrical power and wastes some of the water.

Except for high-temperature boiling, the aforesaid methods are difficult to carry out thoroughly in any developing country with a population of hundreds of millions, because of a shortage of water, chemicals, reserves, and electricity. To solve the problem with a deficiency of safe drinking water, it is imperative to provide a system and method for generating sterile safe drinking water easily in the absence of electrical power.

SUMMARY OF THE INVENTION

In order to achieve the above and other objectives, it is an aspect of the present disclosure to provide a device, a system and a method for generating sterile water in the absence of electrical power.

It is also an aspect of the present disclosure to provide a device, a system and a method for generating sterile water under gravity.

According to the aforesaid aspects, the present disclosure provides a system for generating sterile water. The system for generating sterile water includes a liquid holding container having thereon a container outlet; a filtration device comprising therein a low-pressure-differential (LPD) pathogen filtration portion, wherein the filtration device has a filtration inlet and a filtration outlet; and a gas tube; wherein the container outlet is connected to the filtration inlet, wherein the filtration inlet has a gas hole with an end connected to the gas hole and another end having a buoy, wherein the sterile water is substantially pathogen-free.

Preferably, the system for generating sterile water further includes a connection pipe for connecting the container outlet and the filtration inlet.

Preferably, the liquid holding container has a compressible structure.

Preferably, the liquid holding container has an outlet switch valve disposed at the container outlet.

Preferably, the liquid holding container has a container inlet, and the container inlet at the liquid holding container is higher than the container outlet at the liquid holding container.

Preferably, the liquid holding container has an inlet switch valve disposed at the container inlet.

Preferably, the filtration device is located at a position lower than that of the liquid holding container while filtration is taking place.

Preferably, the filtration device includes a filtration state monitoring portion, and thereby a user monitors the LPD pathogen filtration portion with the filtration state monitoring portion.

Preferably, the filtration state monitoring portion has a standard comparison portion indicating a normal color or a normal state of the LPD pathogen filtration portion.

Preferably, the filtration device includes an impurity filtration portion.

Preferably, the filtration inlet of the filtration device has a filtration switch valve mechanism.

Preferably, the filtration switch valve mechanism is a push-up switch valve mechanism.

Preferably, the system for generating sterile water further includes a fluid valve connected to the liquid holding container. Preferably, the fluid valve includes a compressible valve body; a fluid valve inlet end; and a fluid valve outlet end; wherein the fluid valve is connected to the liquid holding container via the fluid valve outlet end.

Preferably, the fluid valve inlet end closes but the fluid valve outlet end opens when the compressible valve body is in a compressed state, wherein the fluid valve inlet end opens but the fluid valve outlet end closes when the compressible valve body is in a slackened state.

Preferably, the liquid holding container has a container inlet, and the fluid valve is connected to the container inlet of the liquid holding container.

Preferably, the system for generating sterile water further includes a second connection pipe whereby the fluid valve is connected to a container inlet of the liquid holding container.

According to the aspect of the present disclosure, a portable filtration device for providing a substantially pathogen-free water is provided, including: a container body, having a low-pressure-differential (LPD) pathogen filtration portion nested therein, the LPD pathogen filtration portion dividing the interior of the container body into a first chamber and a second chamber which is separated from but fluidly communicated to the first chamber, wherein the first chamber is located at a center portion of the interior of the container body, and the second chamber is surrounding the first chamber, and wherein the container body is provided with a filtration state monitoring portion thereon; an inlet for receiving a liquid to be treated, the inlet being configured at an end of the container body and being fluidly connected to the first chamber; and an outlet for discharging a treated liquid, the outlet being configured at an opposite end of the container body and being fluidly connected to a second chamber.

Preferably, the container body has a transparent window forming the filtration state monitoring portion, and wherein the filtration state monitoring portion includes a standard comparison portion indicating a normal state of the LPD pathogen filtration portion.

Preferably, the portable filtration device further includes a filtration switch valve, wherein the inlet is opened to the first chamber or closed from the first chamber by rotating of the filtration switch valve.

Preferably, the outlet is provided with a protective structure for preventing foreign bodies from entering the outlet and the container body.

The present disclosure further provides a method for generating sterile water, using a system for generating sterile water to generate a substantially pathogen-free sterile water, wherein the system for generating sterile water comprises a liquid holding container, a filtration device comprising a low-pressure-differential (LPD) pathogen filtration portion therein and a filtration inlet, and a gas tube with an end connected to the filtration inlet and another end having a buoy, wherein the filtration device is connected to the liquid holding container by the filtration inlet. The method for generating sterile water includes the steps of: introducing a liquid to be filtered into the liquid holding container; positioning the filtration device lower than the liquid holding container; delivering the liquid to be filtered automatically to the filtration inlet of the filtration device under gravity; filtering the liquid to be filtered in the filtration device under gravity; maintaining pressure in the liquid holding container with the gas tube; and fetching filtered sterile water from a filtration outlet of the filtration device.

Preferably, the filtration inlet of the filtration device has a filtration switch valve mechanism, wherein, before the step of filtering the liquid to be filtered in the filtration device under gravity, the method for generating sterile water further comprises opening the filtration switch valve mechanism.

Preferably, the system for generating sterile water includes a fluid valve connected to the liquid holding container and has a compressible valve body, and the method for generating sterile water further includes the step of compressing and slackening the compressible valve body so as to introduce fluid into the liquid holding container; wherein the fluid is air or liquid to be filtered.

Preferably, the method for generating sterile water further includes the step of monitoring a state of use of the LPD pathogen filtration portion with a filtration state monitoring portion of the filtration device.

In a preferred embodiment of the present disclosure, the method for generating sterile water further includes the steps of: comparing the low-pressure-differential pathogen filtration portion with a standard comparison portion of the filtration state monitoring portion to yield a comparison result; and determining, according to the comparison result, whether to change the low-pressure-differential pathogen filtration portion.

The aforesaid and other aspects of the present disclosure are illustrated by non-restrictive specific embodiments below, described hereunder in detail, and depicted by accompanying drawings.

BRIEF DESCRIPTION OF THE DRAWINGS

The aforesaid and other aspects of the present disclosure are illustrated by non-restrictive specific embodiments below, described hereunder in detail, and depicted by accompanying drawings, wherein.

DETAILED DESCRIPTION OF THE EMBODIMENTS

Figure 1:
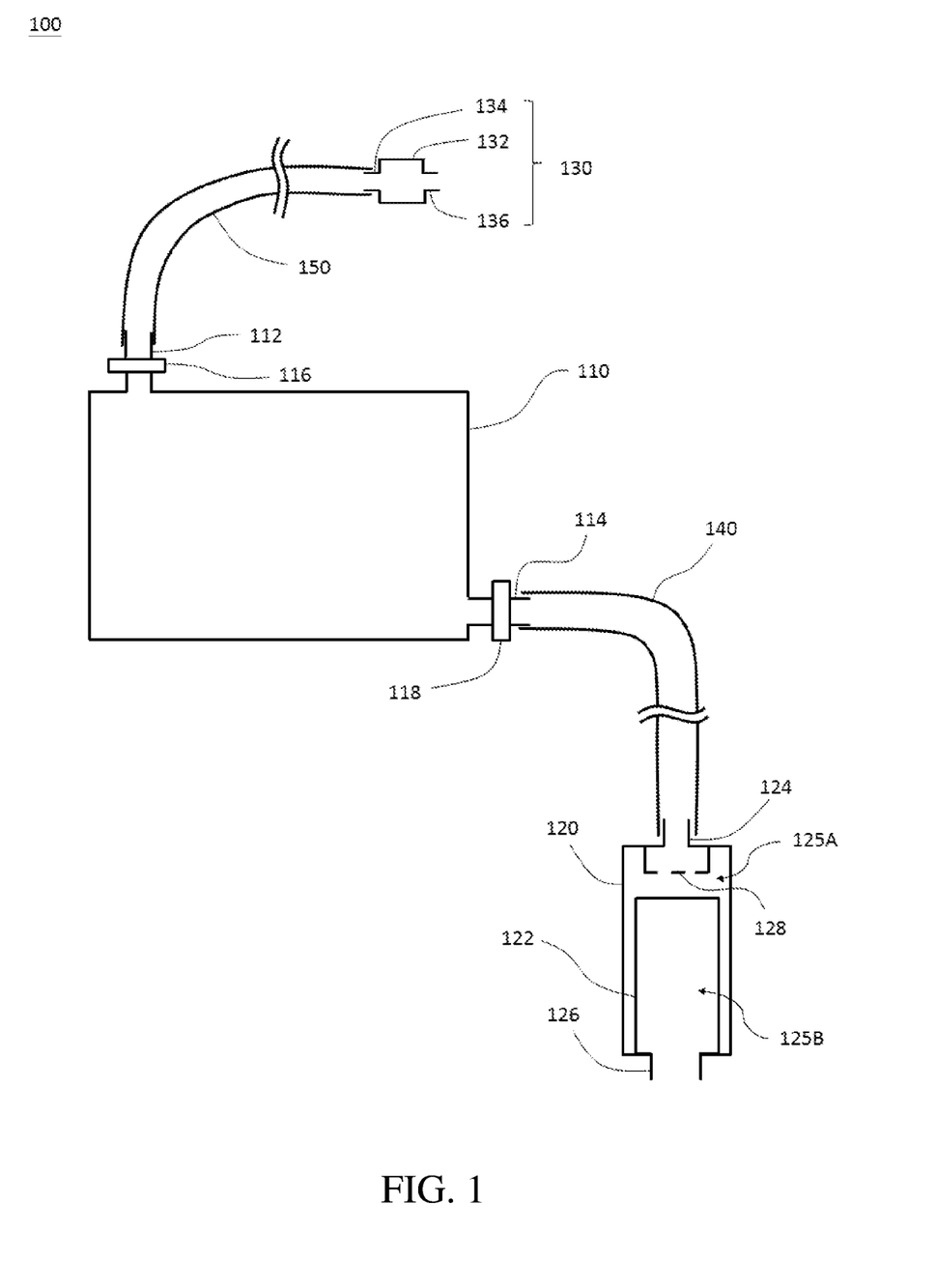
FIG. 1 is a schematic view of a system for generating sterile water according to an illustrative embodiment of the present disclosure.

Referring to FIG. 1, there is shown a schematic view of a system for generating sterile water according to a specific embodiment of the present disclosure. The system as shown functions for generating sterile water which is substantially pathogen-free. In the embodiment illustrated by FIG. 1, the system 100 for generating sterile water includes the liquid holding container 110, the filtration device 120, the fluid valve 130, the connection pipe 140, and the second connection pipe 150. The liquid holding container 110 includes the container inlet 112, the inlet switch valve 116 disposed on the container inlet 112, the container outlet 114, and the outlet switch valve 118 disposed on the container outlet 114. The user can open or shut the container inlet 112 with an inlet switch valve 116, and open or shut the container outlet 114 with the outlet switch valve 118. In a specific embodiment, the container inlet 112 at the liquid holding container 110 is located at a position higher than that of the container outlet 114 at the liquid holding container 110. Therefore, the user can supplement, at any time, liquid to be filtered even while filtration is taking place. In a specific embodiment, the liquid holding container 110 has a compressible structure. Therefore, when the liquid holding container 110 is in a compressed state, its volume is greatly reduced and thereby conveniently portable. The compressible structure is conducive to reduction in the total volume of the containers to transport such that the system of the present disclosure can be widely used in inaccessible, remote, and developing regions. In a specific embodiment, the liquid holding container 110 has a handle to add to its portability.

In the embodiment illustrated by FIG. 1, the filtration device is constructed mainly by the container body 120, and therein a low-pressure-differential (LPD) pathogen filtration portion 122 is nested. The interior of the container body 120 is divided into two separate but fluidly communicating chambers 125A and 125B by the LPD pathogen filtration portion 122, wherein the second chamber 125B is located at a center portion of the interior of the container body 120 and the first chamber 125A is surrounding the second chamber 125B. Further, the container body 120 is provided with a filtration state monitoring portion thereon (shown in FIG. 3A). The filtration device includes an inlet 124 for receiving a liquid to be treated or filtered. The inlet 124 is configured at an end of the container body 120 (e.g. the end connected to the liquid holding container 110), and is fluidly connected to the first chamber 125A. The filtration device includes an outlet 126 for discharging the treated liquid for the user fetching. The outlet 126 is configured at an opposite end of the container body 120 (i.e. the end opposite to the inlet 124) and is fluidly connected to the second chamber 125B. According to the present disclosure, the filtration inlet 124 further has a filtration switch valve mechanism 128 whereby the user can open or shut the filtration inlet 124. The container outlet 114 is connected to the filtration inlet 124 of the filtration device 120 by the connection pipe 140. The filtration device 120 is arranged at a location lower than that of the liquid holding container 110 while the filtration is taking place. Therefore, the liquid to be filtered and contained in the liquid holding container 110 can be delivered automatically to the filtration inlet 124 of the filtration device 120 via the connection pipe 140 under gravity. Table 1 below shows results of a flow rate test conducted on the filtration device 120 in a specific embodiment.

TABLE 1

|  | Feed (meter) | | |
| --- | --- | --- | --- |
|  | 1 | 2 | 3 |
| Average flow rate (liter/min) in first test | 0.86 | 1.50 | 2.07 |
| Average flow rate (liter/min) in second test | 0.96 | 1.31 | 1.85 |

In a specific embodiment, the filtration device 120 further includes therein an activated carbon device for removing the color, odor and VOCs (Volatile Organic Chemicals) of the liquid to be filtered. In a specific embodiment, the LPD pathogen filtration portion 122 carries positive charges and thereby can adsorb an object. In a specific embodiment, the LPD pathogen filtration portion 122 is the biological filter in the apparatus, EZ-AQUA 250B, produced by Ezek Technology, Inc., and data descriptive of its efficiency is shown in Table 2 below.

TABLE 2

| Count of E. Coli introduced into water purifier ($10^9$ CFU) | 4.32 | 4.62 | 5.46 | 7.68 | 15.54 | 38.22 |
| --- | --- | --- | --- | --- | --- | --- |
| Count of E. Coli in filtered water in water purifier (CFU) | <1 | <1 | <1 | <1 | <1 | <1 |
| E. Coli removal efficiency | >99.9999% | >99.9999% | >99.9999% | >99.9999% | >99.9999% | >99.9999% |

In a specific embodiment, the LPD pathogen filtration portion 122 is the biological filter in the apparatus, BIO-Z003, produced by Ezek Technology, Inc., and data descriptive of its efficiency is shown in Table 3 below. In Table 3, the filtration efficiency shows the result of neurone virus filtration. The concentration of the challenge neurone virus solution is $8.7*10^6$ (copies/ml).

TABLE 3

| Count of neurone virus accumulated in water purifier (copies) | $8.7*10^6$ | $4.4*10^9$ | $8.7*10^9$ | $1.3*10^{10}$ | $1.7*10^{10}$ |
| --- | --- | --- | --- | --- | --- |

TABLE 3-continued

| | | | | | |
|---|---|---|---|---|---|
| Count of neurone virus filtered water in water purifier | ND | ND | ND | ND | ND |
| Neurone virus removal efficiency | >99.9999% | >99.9999% | >99.9999% | >99.9999% | >99.9999% |

In the embodiment illustrated by FIG. 1, the fluid valve 130 includes the compressible valve body 132, the fluid valve inlet end 136, and the fluid valve outlet end 134. The fluid valve 130 is connected to the second connection pipe 150 by the fluid valve outlet end 134 and connected to the container inlet 112 of the liquid holding container 110 by the second connection pipe 150. The fluid valve inlet end 136 closes but the fluid valve outlet end 134 opens when the compressible valve body 132 is in a compressed state. The fluid valve inlet end 136 opens but the fluid valve outlet end 134 closes when the compressible valve body 132 is in a slackened state. Therefore, the user compresses and slackens the compressible valve body 132 to thereby introduce fluid (for example, air or liquid to be filtered) into the liquid holding container 110, so as to supplement the input pressure or the liquid to be filtered in the liquid holding container 110. In another specific embodiment, the fluid valve 130 is connected to the liquid holding container 110 directly, i.e., not by the second connection pipe 150. For example, the fluid valve 130 is directly connected to the liquid holding container 110 by the fluid valve outlet end 134, or the fluid valve 130 is directly connected to the container inlet 112 of the liquid holding container 110.

Figure 2A:
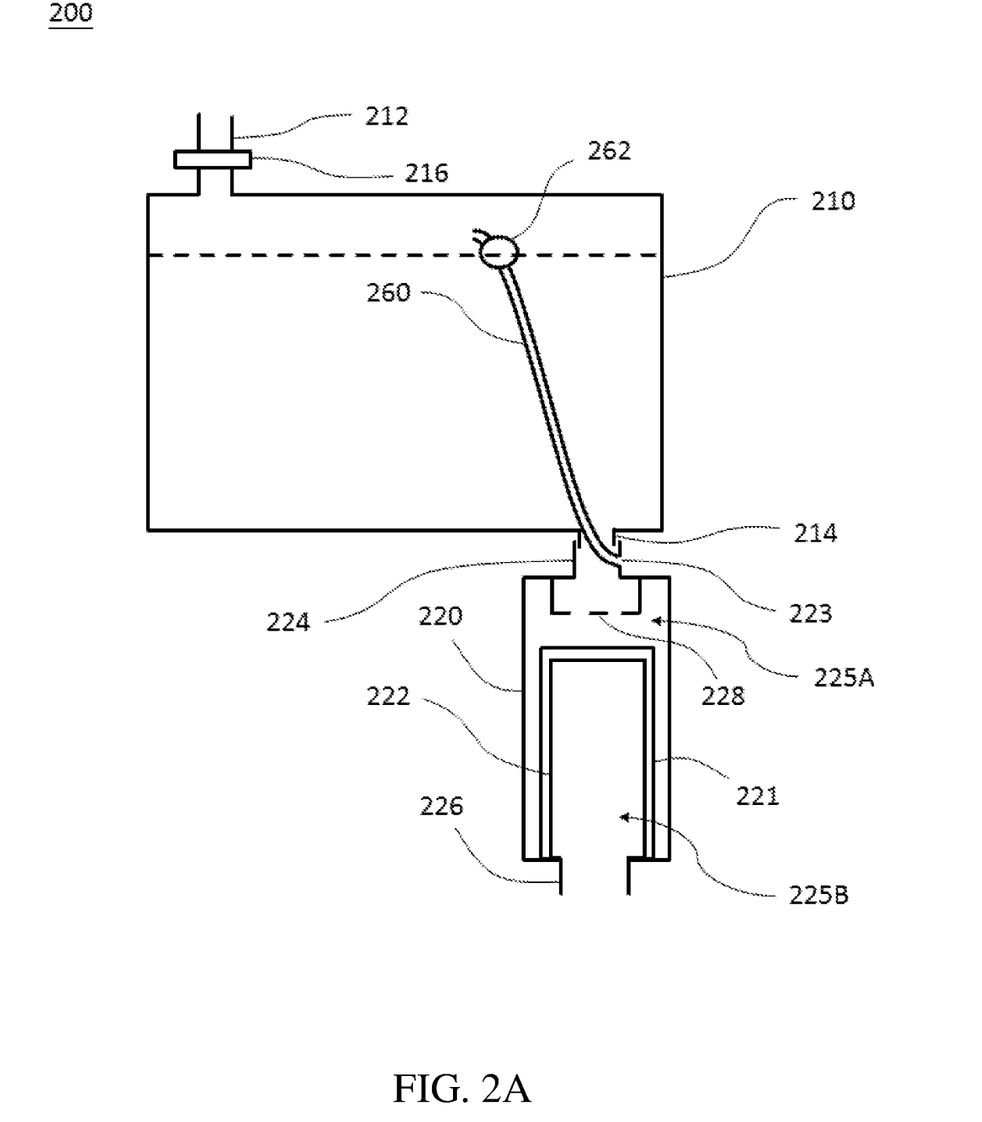
FIG. 2A is a schematic view of the system for generating sterile water according to another illustrative embodiment of the present disclosure.

Please refer to FIG. 2A, which shows a schematic view of the system for generating sterile water according to another illustrative embodiment of the present disclosure. As shown, in the system 200 for generating sterile water, the filtration device 220 is connected to the container outlet 214 of a liquid holding container 210 via a filtration inlet 224. As shown, the filtration device 220 is constructed in a way similar to that of filtration device 120. The filtration device is constructed mainly by the container body 220, and therein a low-pressure-differential (LPD) pathogen filtration portion 222 is nested. The interior of the container body 220 is divided into two separate but fluidly communicating chambers 225A and 225B by the LPD pathogen filtration portion 222, wherein the second chamber 225B is located at a center portion of the interior of the container body 220 and the first chamber 225A is surrounding the second chamber 225B. Further, the container body 220 is provided with a filtration state monitoring portion thereon (shown in FIG. 3A). The filtration device includes an inlet 224 for receiving a liquid to be treated or filtered. The inlet 224 is configured at an end of the container body 220 (e.g. the end connected to the liquid holding container 210), and is fluidly connected to the first chamber 225A. The filtration device includes an outlet 226 for discharging the treated liquid. The outlet 226 is configured at an opposite end of the container body 220 (i.e. the end opposite to the inlet 224) and is fluidly connected to the second chamber 225B. According to the embodiment of the disclosure, the filtration device is further provided with an impurity filtration portion 221, such that the liquid to be filtered would be passed through the LPD pathogen filtration portion 222 to generate sterile water after the sludge or impurity contained in the liquid has been filtered and removed by passing the liquid to be filtered through the impurity filtration portion 221. The filtration inlet 224 of the filtration device 220 has a gas hole 223. The system 200 for generating sterile water further includes a gas tube 260. The gas tube 260 is introduced into the liquid holding container 210 via the container outlet 214. One end of the gas tube 260 is connected to the gas hole 223, while the other end of the gas tube 260 has a buoy 262 and stays above water because of the buoy 262. Therefore, the gas tube 260 maintains the pressure in the liquid holding container 210, using the gas hole 223, so as to ensure that the liquid in the liquid holding container 210 flows toward the filtration device 220 smoothly.

Figure 2B:
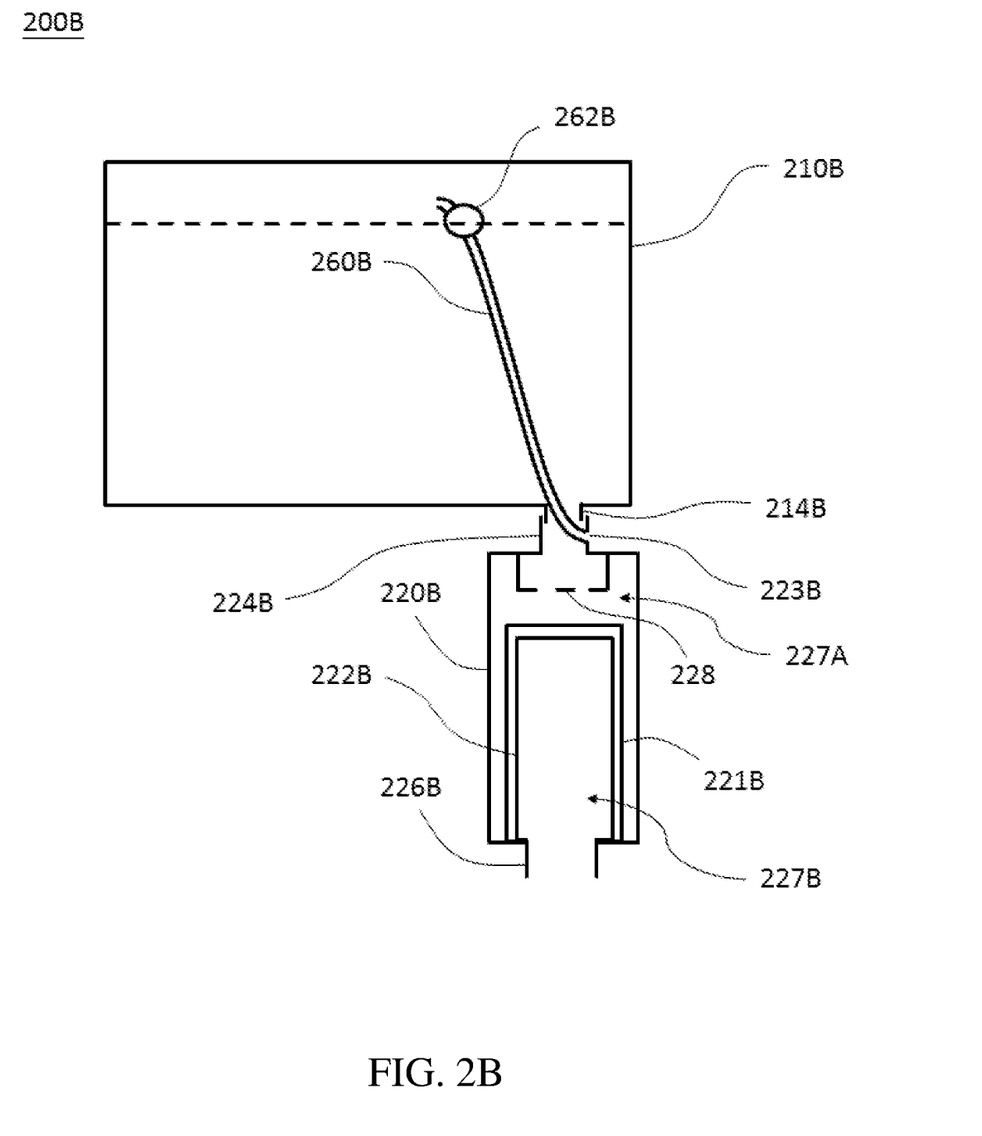
FIG. 2B is a schematic view of the system for generating sterile water according to yet another illustrative embodiment of the present disclosure.

Please refer to FIG. 2B, showing a schematic view of the system for generating sterile water according to yet another illustrative embodiment of the present disclosure. In the embodiment illustrated by FIG. 2B, the liquid holding container 210B of the system 200B for generating sterile water has the container outlet 214B only. The liquid to be filtered is introduced into the liquid holding container 210B via the container outlet 214B (The container outlet 214B functions as the container inlet also.) After the liquid to be filtered has been introduced into the liquid holding container 210B, the filtration device 220B of the system 200B for generating sterile water is connected to the container outlet 214B of the liquid holding container 210B via the filtration inlet 224B. The filtration device 220B has a filtration switch valve mechanism 228B. In a specific embodiment, the filtration switch valve mechanism 228B is a rotary switch valve mechanism, and thus the user can rotate the filtration switch valve mechanism 228B to open or shut the filtration inlet 224B. In another specific embodiment, the filtration switch valve mechanism 228B is a push-up switch valve mechanism such that the user can push the main portion (the main portion 328 shown in FIG. 3B through FIG. 3E) of the filtration device 220B toward the body portion (the body portion 327 shown in FIG. 3B through FIG. 3E) of the filtration device 220B to open the filtration inlet 224B, and the filtration inlet 224B is in a shut state when the user does not push the main portion of the filtration device 220B toward the body portion of the filtration device. In a specific embodiment, a spring is disposed between the main portion of the filtration device 220B and the body portion of the filtration device 220B and adapted to draw the main portion of the filtration device 220B and the body portion of the filtration device 220B closer to each other in the absence of any pushing, applied force; meanwhile, the main portion of the filtration device 220B clogs and shuts the liquid flow channel between the main portion of the filtration device 220B and the body portion of the filtration device 220B. The aforesaid rotary and push-up filtration switch valve mechanisms merely serve as exemplary purposes. However, the filtration switch valve mechanisms are not necessarily rotary or push-up but can be of any other types as needed.

Figure 3A:
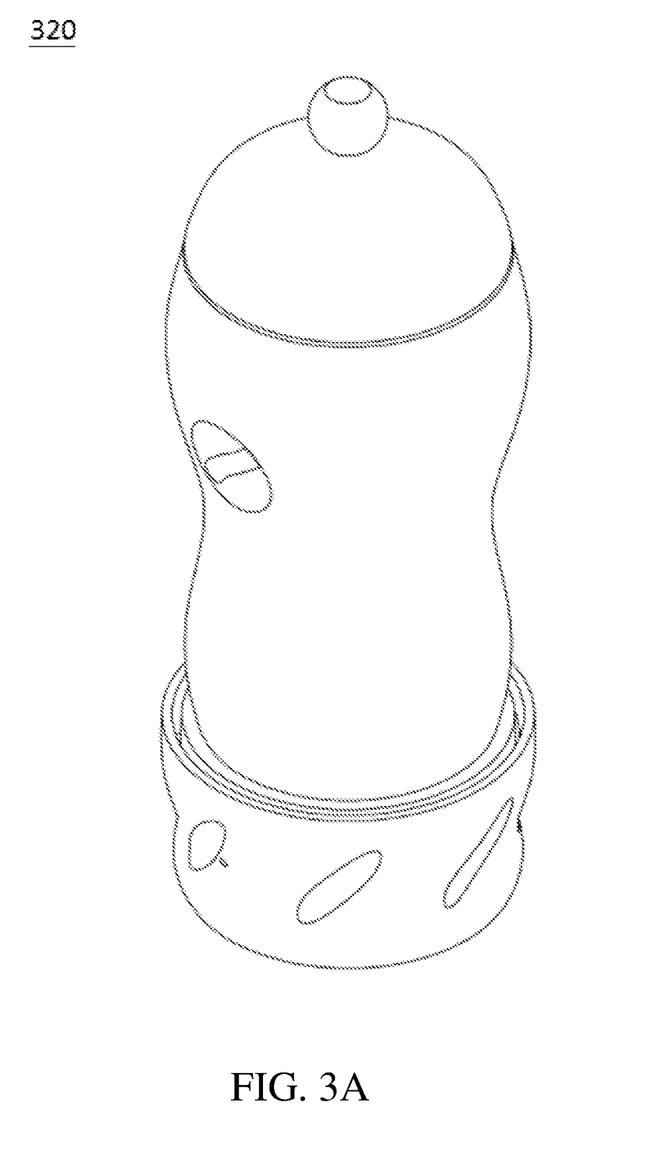
FIGS. 3A to 3G are views illustrating a filtration device according to an embodiment of the present disclosure.
Figure 3B:
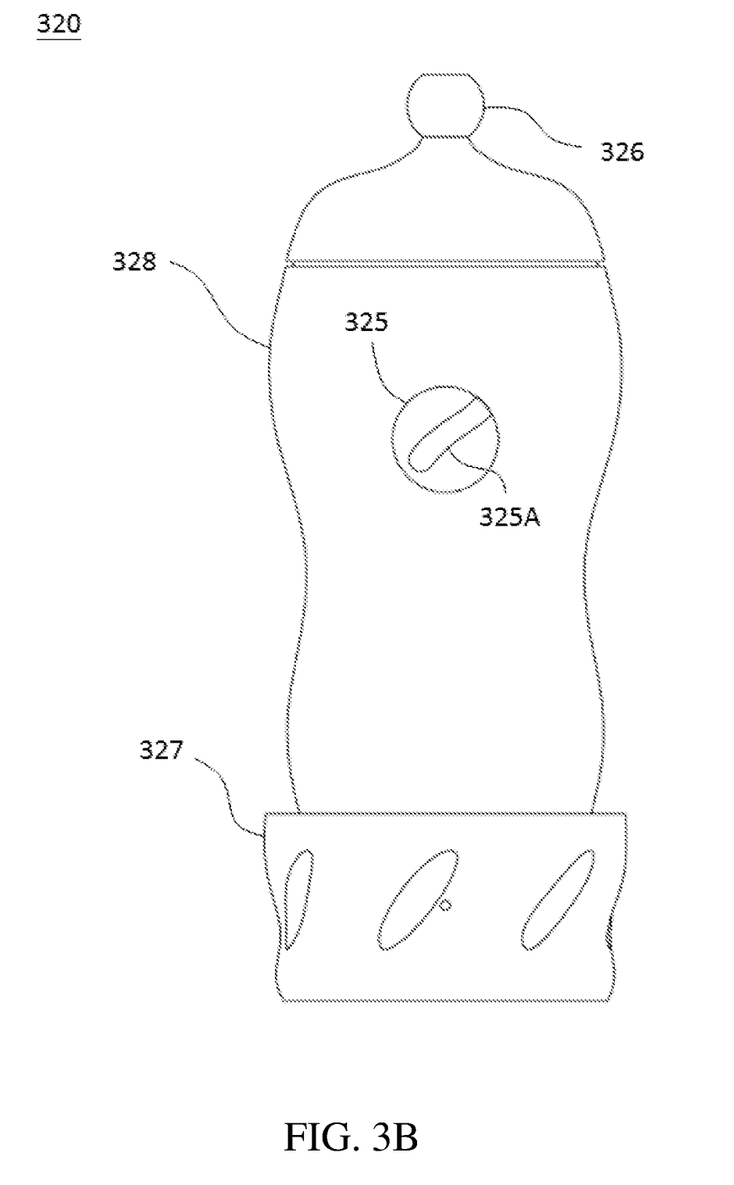
Figure 3C:
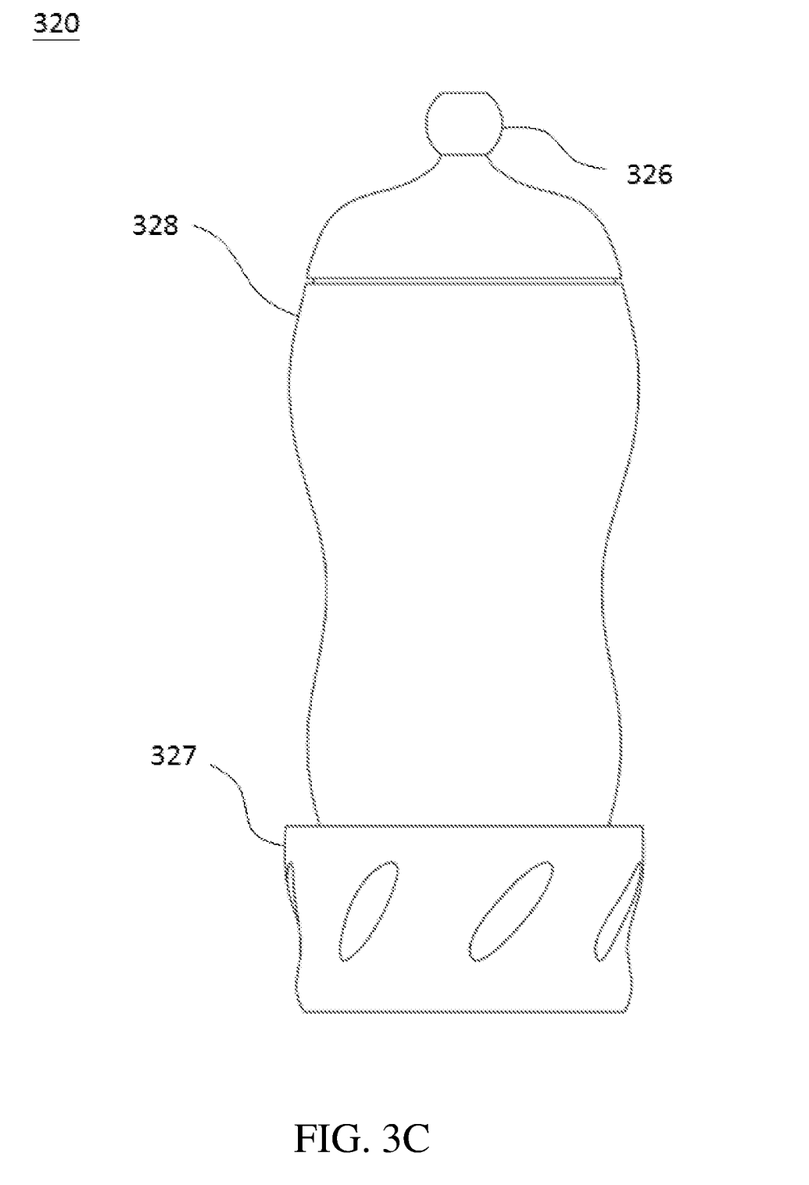
Figure 3D:
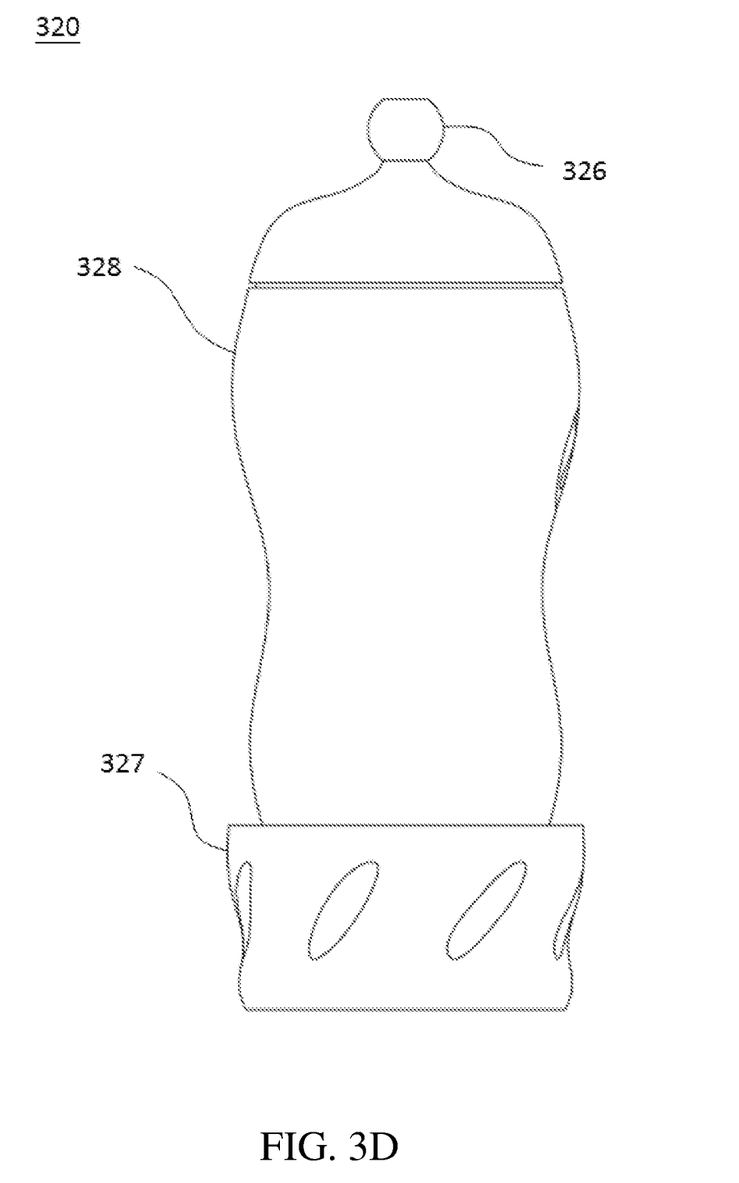
Figure 3E:
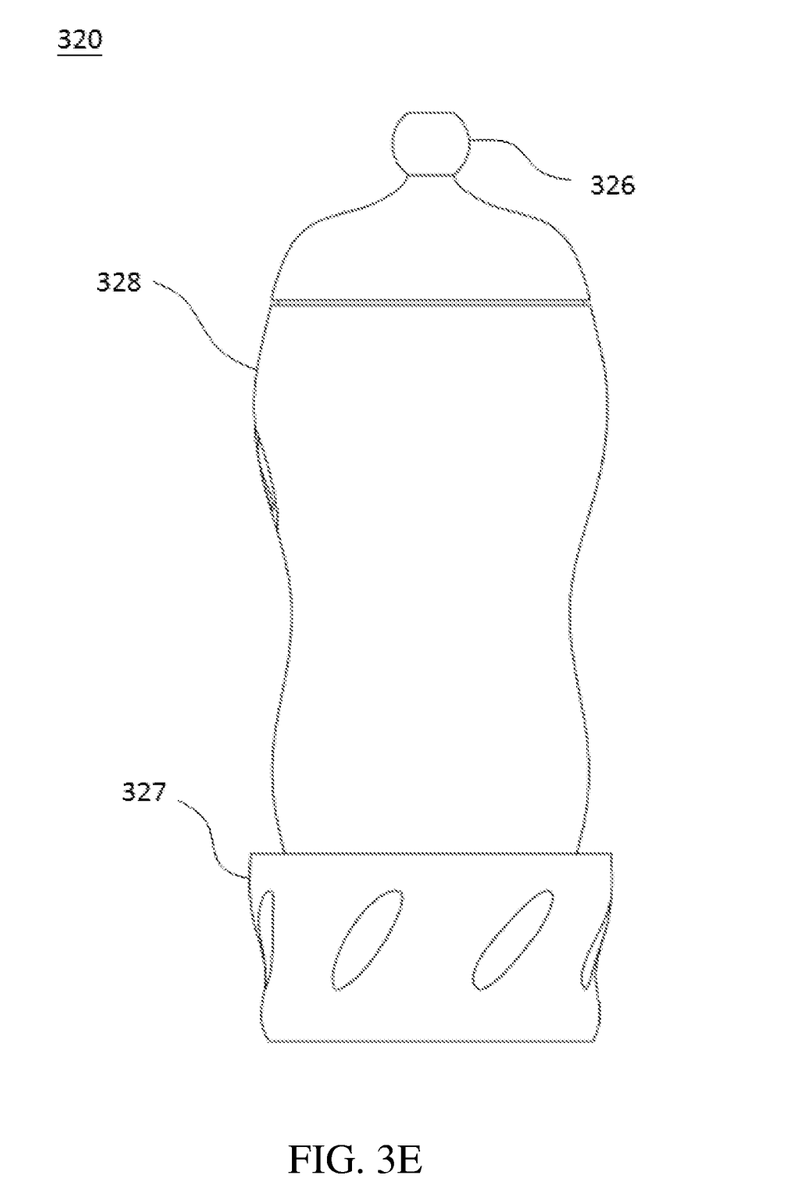
Figure 3F:
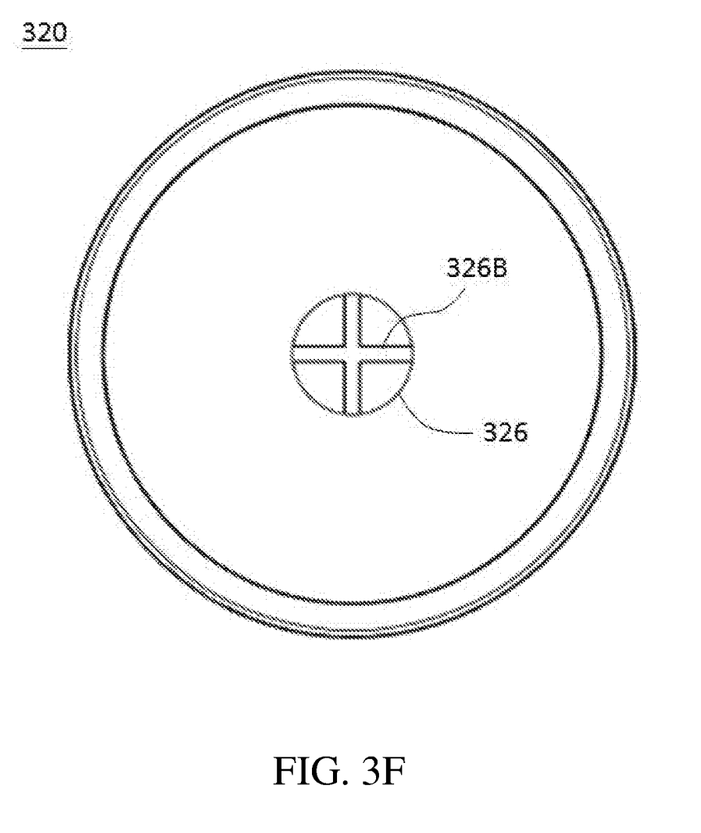
Figure 3G:
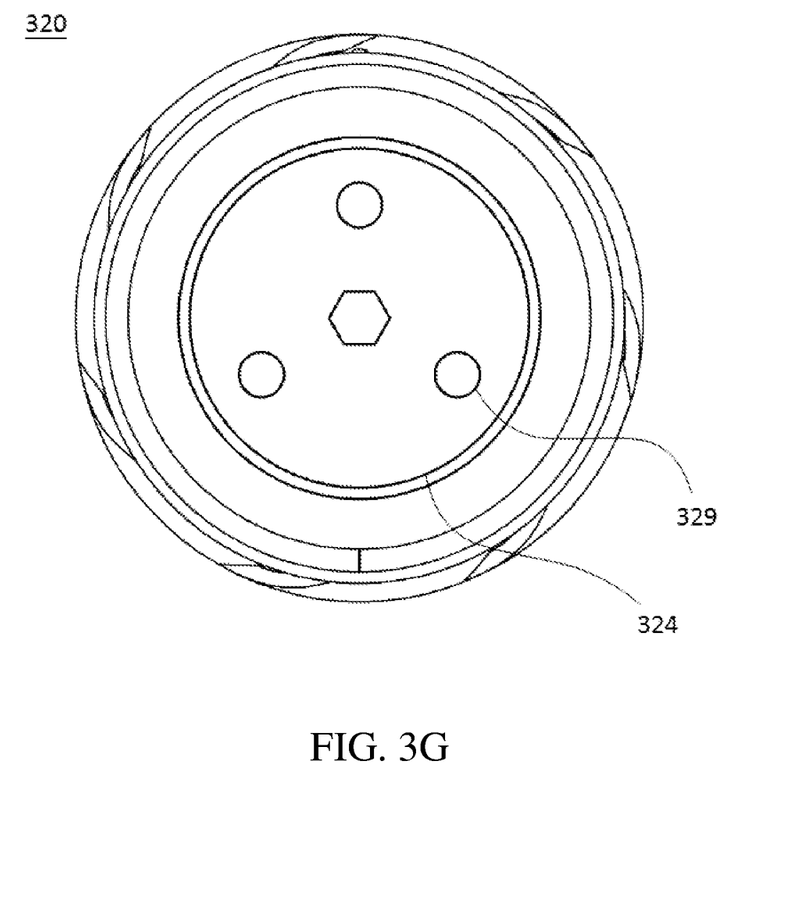

Referring to FIGS. 3A to 3G, the filtration device according to an illustrative embodiment of the present disclosure is shown. Among these figures, FIG. 3A is a perspective view showing the filtration device, and FIGS. 3B to 3G show respectively the front view, the rear view, the left lateral view, the right lateral view, the top view and the bottom view of the illustrative filtration device. The filtration device, preferably, the portable filtration device is applied as the filtration device in the system as shown in FIG. 1, FIG. 2A and FIG. 2B, respectively. Alternatively, the portable filtration device can be used independently. As shown, the portable filtration device 320 includes a filtration state monitoring portion 325 which is transparent. The filtration state monitoring portion 325 has thereon a standard comparison portion 325A showing the normal color or normal state of the low-pressure-differential (LPD) pathogen filtration portion. Therefore, the user can monitor the LPD pathogen filtration portion disposed in the filtration device 320 and compares the LPD pathogen filtration portion with the standard comparison portion 325A, so as to identify the current state of the LPD pathogen filtration portion, and to determine if the LPD pathogen filtration portion needs to be replaced. Furthermore, the filtration inlet 324 of the filtration device 320 has a filtration switch valve mechanism 329 for the user to rotate the body portion 327 of the filtration device 320, so as to open or shut the filtration switch valve mechanism 329. Therefore, the user can decide when to allow the liquid to be filtered to flow into the filtration device 320 via the filtration inlet 324 and thereby fetch filtered sterile water for drinking from a filtration outlet 326 of the filtration device 320. Referring to FIG. 3F, the filtration outlet 326 has therein a cruciform protective structure 326B whereby foreign bodies (for example, club-shaped objects or pointed objects) are prevented from entering the filtration outlet 326 and the filtration device 320, or thus damaging the LPD pathogen filtration portion in the filtration device 320. The protective structure 326B is not necessarily cruciform-typed but may be of any other shape as needed.

Figure 4:
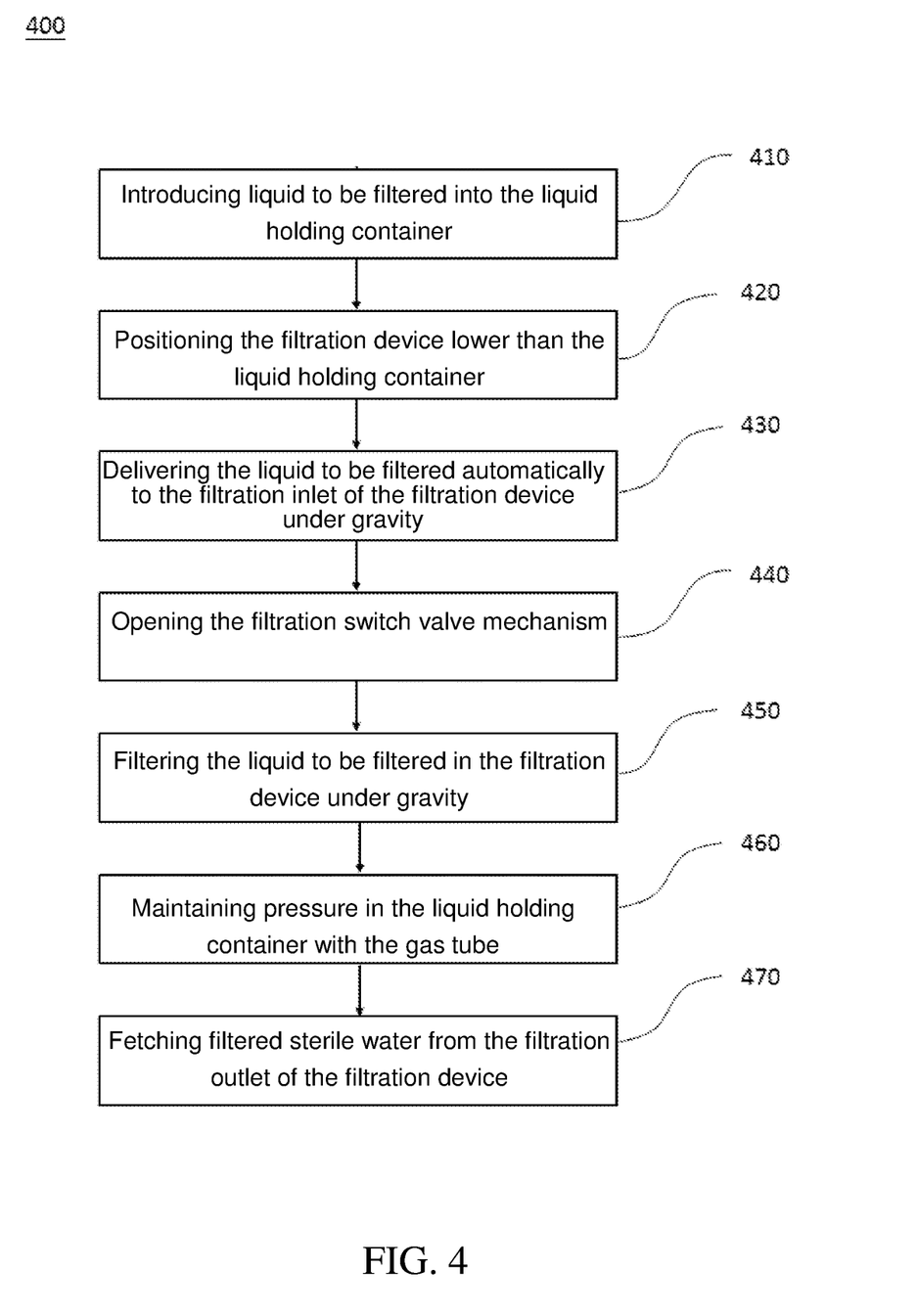
FIG. 4 is a flowchart illustrating the method for generating sterile water according to an illustrative embodiment of the present disclosure.

FIG. 4 shows the flowchart illustrating the method for generating sterile water according to an illustrative embodiment of the present disclosure. According to the present disclosure, the method for generating sterile water is carried out by the system as shown in FIGS. 1, 2A and 2B for generating sterile water which is substantially pathogen-free. As mentioned, the system for generating sterile water includes a liquid holding container; a filtration device comprising a filtration inlet; and a gas tube with one end connected to the filtration inlet and the other end having a buoy; wherein the filtration device is connected to the liquid holding container via the filtration inlet, wherein the filtration device includes a low-pressure-differential (LPD) pathogen filtration portion therein, and the filtration inlet of the filtration device has a filtration switch valve mechanism. In the embodiment illustrated by FIG. 4, the method for generating sterile water starts with introducing the liquid to be filtered into the liquid holding container (step 410), wherein the liquid to be filtered can be any liquid, for example, water from a river or a well. Then, the filtration device is positioned lower than the liquid holding container (step 420), such that sterile water, which is substantially pathogen-free, is generated by filtration under gravity in the absence of any driving power. Then, the liquid to be filtered is delivered automatically to the filtration inlet of the filtration device under gravity (step 430). After that, the filtration switch valve mechanism is opened (step 440), and the liquid to be filtered is filtered in the filtration device under gravity (step 450). Then, the pressure in the liquid holding container is controlled and maintained by controlling the gas tube (step 460). Finally, the method includes fetching the filtered sterile water from the filtration outlet of the filtration device for drinking (step 470).

As mentioned, in a specific embodiment, the system for generating sterile water includes a fluid valve connected to the liquid holding container, and the fluid valve has a compressible valve body. Prior to any one of the aforesaid steps of the method for generating sterile water, the method further includes an additional step as follows: compressing and slackening the compressible valve body to thereby introduce fluid into the liquid holding container. In a specific embodiment, the fluid is air for maintaining or increasing the pressure in the liquid holding container and enhancing filtration. In another specific embodiment, the fluid is the liquid to be filtered for supplementing the liquid to be filtered in the liquid holding container. As mentioned, in a specific embodiment, the filtration device includes a filtration state monitoring portion which is transparent, and the filtration state monitoring portion has thereon a standard comparison portion indicating the normal color or normal state of the LPD pathogen filtration portion. Prior to any one of the aforesaid steps of the method for generating sterile water, the method further includes additional steps as follows: monitoring the state of use of the LPD pathogen filtration portion with the filtration state monitoring portion of the filtration device; comparing the LPD pathogen filtration portion with the standard comparison portion of the filtration state monitoring portion to yield a comparison result; and determining, according to the comparison result, whether to change or replace the LPD pathogen filtration portion. In the aforesaid determining step, for example, the LPD pathogen filtration portion is changed as soon as its color alters. In yet another specific embodiment, before being filtered, the liquid to be filtered undergoes pre-processing, such as coagulation and sedimentation, using, for example, alum and polymeric coagulant.

Although the present disclosure is disclosed above by preferred embodiments, the preferred embodiments are not restrictive of the present disclosure. Various changes made by persons skilled in the art to the preferred embodiments without departing from the claims and spirit of the present disclosure must be deemed falling within the scope of the present disclosure. Accordingly, the legal protection for the present disclosure should be defined by the appended claims.

What is claimed is:

1. A system for generating sterile water, comprising:
a liquid holding container having thereon a container outlet;
a filtration device comprising therein a low-pressure-differential pathogen filtration portion, wherein the filtration device has a filtration inlet and a filtration outlet; and
a gas tube;
wherein the container outlet is fluidly connected to the filtration inlet,
wherein the filtration inlet has a gas hole one end of the gas tube is connected to the gas hole and another end of the gas tube has a buoy.

2. The system for generating sterile water according to claim 1, further comprising a connection pipe for connecting the container outlet and the filtration inlet.

3. The system for generating sterile water according to claim 1, wherein the liquid holding container has a compressible structure.

4. The system for generating sterile water according to claim 1, wherein the liquid holding container has an outlet switch valve disposed at the container outlet.

5. The system for generating sterile water according to claim 1, wherein the liquid holding container has a container inlet, and the container inlet at the liquid holding container is located at a position higher than that of the container outlet at the liquid holding container.

6. The system for generating sterile water according to claim 5, wherein the liquid holding container has an inlet switch valve disposed at the container inlet.

7. The system for generating sterile water according to claim 1, wherein the filtration device is located at a position lower than that of the liquid holding container while filtration is taking place.

8. The system for generating sterile water according to claim 1, wherein the filtration device comprises a filtration state monitoring portion, thereby a user monitors the low-pressure-differential pathogen filtration portion with the filtration state monitoring portion.

9. The system for generating sterile water according to claim 8, wherein the filtration state monitoring portion has a standard comparison portion indicating a normal color or a normal state of the low-pressure-differential pathogen filtration portion.

10. The system for generating sterile water according to claim 1, wherein the filtration device comprises an impurity filtration portion.

11. The system for generating sterile water according to claim 1, wherein the filtration device is further provided with an activated carbon device.

12. The system for generating sterile water according to claim 1, wherein the filtration inlet of the filtration device has a filtration switch valve mechanism.

13. The system for generating sterile water according to claim 12, wherein the filtration switch valve mechanism is a push-up switch valve mechanism.

14. The system for generating sterile water according to claim 1, further comprising a fluid valve connected to the liquid holding container, the fluid valve comprising:
   a compressible valve body;
   a fluid valve inlet end; and
   a fluid valve outlet end,
   wherein the fluid valve is connected to the liquid holding container via the fluid valve outlet end.

15. The system for generating sterile water according to claim 14, wherein the fluid valve inlet end closes but the fluid valve outlet end opens when the compressible valve body is in a compressed state, wherein the fluid valve inlet end opens but the fluid valve outlet end closes when the compressible valve body is in a slackened state.

16. The system for generating sterile water according to claim 14, wherein the liquid holding container has a container inlet, and the fluid valve is connected to the container inlet of the liquid holding container.

17. The system for generating sterile water according to claim 14, further comprising a second connection pipe whereby the fluid valve is connected to a container inlet of the liquid holding container.

18. A method for generating sterile water, being carried out by a system for generating sterile water to generate a pathogen-free sterile water, wherein the system for generating sterile water comprises a liquid holding container, a filtration device comprising a low-pressure-differential pathogen filtration portion therein and a filtration inlet, and a gas tube with an end connected to the filtration inlet and another end having a buoy, wherein the filtration device is connected to the liquid holding container by the filtration inlet, wherein the method for generating sterile water comprises the steps of:
   introducing liquid to be filtered into the liquid holding container;
   positioning the filtration device lower than the liquid holding container;
   delivering the liquid to be filtered automatically to the filtration inlet of the filtration device under gravity;
   filtering the liquid to be filtered in the filtration device under gravity;
   maintaining pressure in the liquid holding container with the gas tube; and
   fetching filtered sterile water from a filtration outlet of the filtration device.

* * * * *